United States Patent [19]
Johnson et al.

[11] Patent Number: 4,927,468
[45] Date of Patent: May 22, 1990

[54] PROCESS FOR MAKING A MARTENSITIC STEEL ALLOY FUEL CLADDING PRODUCT

[75] Inventors: Gerald D. Johnson; Ralph J. Lobsinger, both of Kennewick; Margaret L. Hamilton, Richland; David S. Gelles, West Richland, all of Wash.

[73] Assignee: The United States of America as represented by the United States Department of Energy, Washington, D.C.

[21] Appl. No.: 278,068

[22] Filed: Nov. 30, 1988

[51] Int. Cl.$^5$ .............................................. C21D 9/00
[52] U.S. Cl. ......................................... 148/3; 148/135
[58] Field of Search ................ 376/339, 900; 148/325, 148/135, 3; 420/69

[56] References Cited

U.S. PATENT DOCUMENTS

| | | | |
|---|---|---|---|
| 4,158,606 | 6/1979 | Bloom et al. | 420/53 |
| 4,407,673 | 10/1983 | Korenko | 420/53 |
| 4,421,572 | 12/1983 | Bates et al. | 148/123 |
| 4,530,719 | 7/1985 | Johnson et al. | 420/53 |
| 4,560,407 | 12/1985 | Yoshida et al. | 376/900 |
| 4,576,641 | 3/1986 | Bates et al. | 420/53 |
| 4,818,485 | 4/1989 | Maziasz | 376/900 |

OTHER PUBLICATIONS

Bennett and Horton; "Material Requirements for Liquid Metal Fast Breeder Reactor"; Metallurgical Trans. A; vol. 9A, Feb. 1978, pp. 143–149.

Fujita et al; "Effect of Mo and W on Long Term Creep Rupture Strength of 12% Cr Heat–Resisting Steel Containing V, Nb and B"; Trans. ISIL, vol. 18, 1978, pp. 115–124.

Primary Examiner—Deborah Yee
Attorney, Agent, or Firm—R. A. Stoltz

[57] ABSTRACT

This is a very narrowly defined martensitic steel alloy fuel cladding material for liquid metal cooled reactors, and a process for making such a martensitic steel alloy material. The alloy contains about 10.6 wt. % chromium, about 1.5 wt. % molybdenum, about 0.85 wt. % manganese, about 0.2 wt. % niobium, about 0.37 wt. % silicon, about 0.2 wt. % carbon, about 0.2 wt. % vanadium, 0.05 maximum wt. % nickel, about 0.015 wt. % nitrogen, about 0.015 wt. % sulfur, about 0.05 wt. % copper, about 0.007 wt. % boron, about 0.007 wt. % phosphorous, and with the remainder being essentially iron. The process utilizes preparing such an alloy and homogenizing said alloy at about 1000° C. for 16 hours; annealing said homogenized alloy at 1150° C. for 15 minutes; and tempering said annealed alloy at 700° C. for 2 hours. The material exhibits good high temperature strength (especially long stress rupture life) at elevated temperature (500°–760° C.).

1 Claim, 1 Drawing Sheet

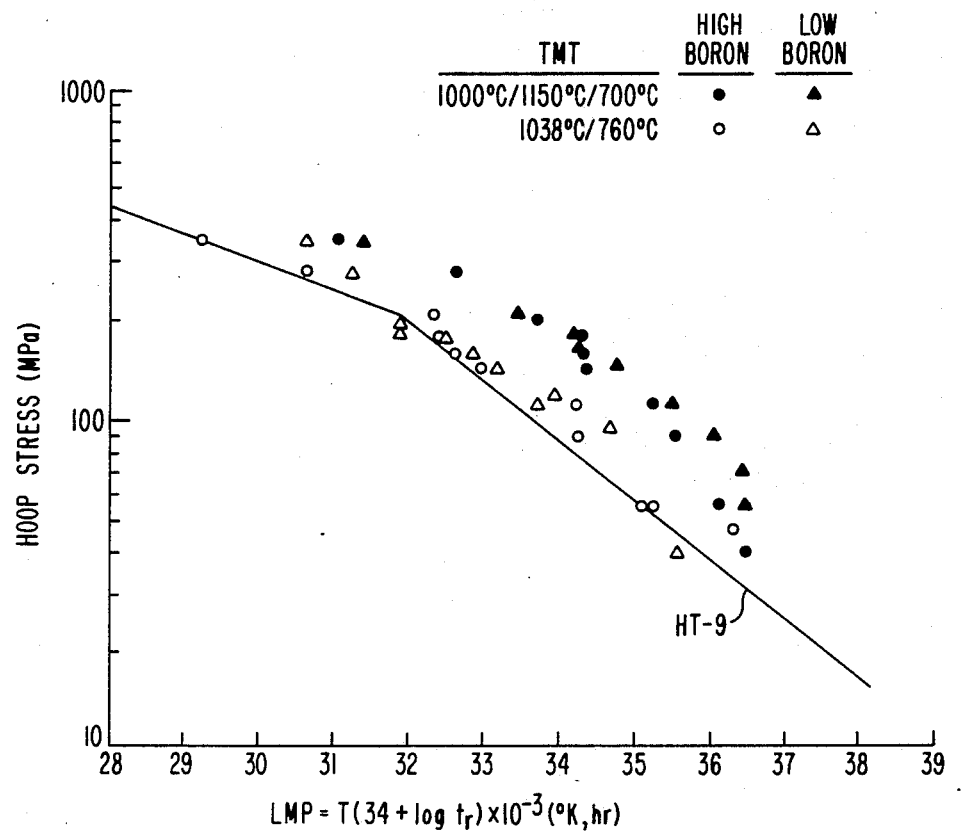

PROCESS FOR MAKING A MARTENSITIC STEEL ALLOY FUEL CLADDING PRODUCT

GOVERNMENT CONTRACT

This invention was conceived or first reduced to practice in the course of, or under contract number DE-AC06-76-FF02170 between Westinghouse Electric Corporation and the U.S. Government, represented by the Department of Energy.

BACKGROUND OF THE INVENTION

The invention relates to a martensitic steel alloy and more particularly to such an alloy as material for fuel cladding for liquid metal cooled reactors.

One of the prime objectives in the efforts to develop a commercially viable liquid metal fast breeder reactor (LMFBR) has been to develop an alloy, or alloys, which are swelling resistant and have the required in-reactor mechanical properties for use as fuel cladding and/or use as ducts. The fuel cladding will see service in contact with flowing liquid sodium and have a surface temperature of about 400° C. ($\sim$715° F.) to 650° C. ($\sim$1200° F.). A duct surrounds each bundle of fuel pins and sees service at about 380° C. ($\sim$715° F.) to 550° C. ($\sim$1020° F.). These components will be exposed at the aforementioned elevated temperatures to fast neutron fluxes on the order of $10^{15}$ n/cm$^2$·S (E>0.1 MeV), and should be capable of performing adequately to fluences on the order of 2 to 3×10$^{23}$ n/cm$^2$ (E>0.1 MeV).

Initially, one of the prime candidate alloys for commercial LMFBR, fuel cladding and ducts was 20% cold worked AISI 316 steel, a solid solution strengthened austenitic stainless steel (see Bennett and Horton, "Material Requirements for Liquid Metal Fast Breeder Reactor," Metallurgical Transactions A, Vol. 9A, February 1978, pp. 143–149). Typical chemistry and material fabrication steps for nuclear grade 316 fuel cladding are described in U.S. Pat. No. 4,421,572 filed on Mar. 18, 1982. The specification of U.S. Pat. No. 4,421,572 is hereby incorporated by reference.

Current commercial composition specifications for nuclear grade 316 stainless steel contain only a maximum value for impurities such as phosphorus, sulphur, boron, aluminum, niobium, vanadium, tantalum, copper and cobalt. Typical commercial melting procedure for this alloy involves double-vacuum melting of electrolytic-grade starting materials. This practice results in low levels of the aforementioned impurities, which depending on the particular impurity, may be 10 to 100 times less than the maximum value allowed by the specification.

However, the 316 alloy undergoes a high degree of void swelling during extended exposure to fast neutron fluxes at the LMFBR operating temperatures. Extensive development efforts aimed at reducing swelling have been undertaken, and are exemplified by U.S. Pat. No. 4,158,606 and U.S. Pat. No. 4,407,673 filed on Jan. 9, 1980. U.S. Pat. No. 4,576,641 pertains to austenitic stainless steels containing increased levels of phosphorus to provide enhanced inreactor swelling resistance. U.S. Pat. No. 4,530,719 provides a solid solution strengthened austenitic stainless steel and notes that stress rupture strength increases as the sum of the phosphorus, sulphur and boron contents of the alloy increase. While the aforementioned efforts have led to improvements in swelling resistance, the stress rupture behavior of these alloys in fuel pin cladding applications remains as one of the major limitations on fuel pin life and improvements in this area are needed for long-life LMFBR cores.

SUMMARY OF THE INVENTION

This is a very narrowly defined martensitic steel alloy fuel cladding material for liquid metal cooled reactors, and a process for making such a martensitic steel alloy material. The alloy consists essentially of 9.6–11.6 wt.% chromium, 1.4–1.6 wt.% molybdenum, 0.75–0.95 wt.% manganese, 0.15–0.25 wt.% niobium, 0.3–0.45 wt.% silicon, 0.15–0.25 wt.% carbon, 0.15–0.25 wt.% vanadium, 0.05 maximum wt.% nickel, 0.01–0.02 wt.% nitrogen, 0.01–0.02 wt.% sulfur, 0.03–0.07 wt.% copper, 0.004–0.010 wt.% boron, 0.005–0.010 wt.% phosphorous, and with the remainder being essentially iron. The process utilizes preparing such an alloy and homogenizing said alloy at about 1000° C. for 16 hours; annealing said homogenized alloy at 1150° C. for 15 minutes; and tempering said annealed alloy at 700° C. for 2 hours. The material exhibits good high temperature strength especially long stress rupture life at elevated temperature (500°–760° C.).

BRIEF DESCRIPTION OF THE DRAWINGS

The invention as set forth in the claims will become more apparent by reading the following detailed description in conjunction with the accompanying drawing in which:

The sole FIGURE is a graph comprising the stress rupture properties of the material of this invention (with high and low boron contents, and with two different thermomechanical treatments) with a prior art (HT-9) material.

DESCRIPTION OF THE PREFERRED EMBODIMENT

This invention describes a composition for a martensitic steel alloy which exhibits good high temperature strength and has potential as a fuel cladding material for advanced liquid metal cooled reactors. The composition of the alloy for this disclosure is Fe-(9.6–11.6)Cr-(1.4–1.6)Mo-(0.75–0.95)Mn-(0.15–0.25)Cb-(0.3–0.45)Si-(0.15–0.25)C-(0.15–0.25)V-(0.05 max)Ni-(0.01–0.02)N-(0.01–0.02)S-(0.03–0.07)Cu-(0.004–0.01)B-(0.005–0.01)P.

This alloy was designed to have good strength (especially long stress rupture life) at elevated temperatures (500°–760° C.). An evaluation indicated that improvements in stress rupture strength of tempered martensitic steels could be obtained by slight changes in the composition and thermomechanical treatment. The compositions of the alloy covered by this disclosure and several other alloys of this generic class of steels are shown in Table 1.

Two heats of the steel described in this disclosure were prepared. One heat was of the exact composition listed above and the second heat was the same except that the boron content was $\approx$0.03% which is the value for the TAF steel (see Table 1 for composition of "TAF"; see also "Effect of Mo and W on Long Term Creep Rupture Strength of 12%Cr Heat-resisting Steel Containing V, Nb and B" by Toshio FUJITA, Takaki SATO and Norio TAKAHASHI, Transactions ISIL Vol. 18, 1978, pages 115–24, an article on compositions related to "TAF").

Heat treatment studies on 9–12Cr alloy steels have been conducted at WHC to maximize the stress rupture strength. For the alloy covered by this invention, the improved thermomechanical treatment (TMT) consists of three steps:

(1) Homogenization at 1000° C. for 16 hours;
(2) Annealing (or normalization) at 1150° C. for 15 minutes; and
(3) Tempering at 700° C. for 2 hours.

Stress rupture tests were conducted on the two lots of tubing with the above improved TMT. In addition, tests were also conducted on cladding with a TMT that had been specified for HT-9 (see Table 1 for composition of "HT-9") in the early stages of its development for LMFBR cladding. This earlier developed TMT consisted of annealing at 1038° C. for 5 minutes followed by tempering at 760° C. for 30 minutes. Results of the stress rupture tests conducted at 593° to 704° C. are shown in FIGURE. In this FIGURE the data are shown with the Larson-Miller Parameter which collapses all the data of a given lot into a single band. The results of this work clearly show that the alloy covered by this invention with the improved TMT exhibits superior rupture life compared to both HT-9 and this alloy with the earlier developed TMT of 1038° C./760° C. Thus, the alloy covered by this invention, when used with the improved TMT, will exhibit good stress rupture behavior for elevated temperature service. As shown in Table 1, the composition of the alloy is different than the current commercially available alloys, both in the U.S. and including the Swedish alloy HT-9 and the Japanese TAF steel. The TAF is similar to the alloy in this disclosure, but has a lower carbon content and a higher boron content. We have used a higher carbon content to produce higher strength and allow the use of a lower boron content. The higher boron content of the TAF steel generally results in welding problems. The alloy covered by this invention also has small, but finite amounts of phosphorus and sulfur. The P, S and B have a strong effect on precipitate formation which in turn controls the rupture life.

TABLE 1

9-12 Cr STEELS Element, weight %

| Name | C | Cr | Mo | Mn | Cb | V | W | Ni | P | S | B | N | Si | Other |
|---|---|---|---|---|---|---|---|---|---|---|---|---|---|---|
| HT-9 | 0.2 | 11.5 | 1.0 | 0.6 | — | 0.3 | 0.5 | 0.5 | — | — | — | — | 0.4 | |
| Carpenter 636 | 0.2-.25 | 12-14 | .75-1.25 | 1 max | — | .2-.5 | .75-1.25 | .5-1.0 | 0.04 max | 0.03 max | — | — | 1 max | |
| H-46 | 0.15-0.2 | 10-14 | 0.5-.8 | 0.5-.8 | — | 0.2-.4 | — | 0.3-0.6 | — | — | — | — | 0.2-.6 | Cb + Ta = .2-.6 |
| AISI 422 | 0.22 | 12 | 1 | 0.8 | — | 0.3 | — | 0.8 | 0.18 | — | — | .027 | 0.29 | |
| Unitemp 1420WM | 0.22 | 2 | 1 | 0.75 | — | 0.25 | 1 | 0.8 | — | — | — | — | 0.4 | |
| TAF | 0.13-0.2 | 10.5-12.5 | 0.6-1.0 | 0.5-1.0 | 0.15-0.3 | 0.3 max | — | — | — | — | 0.02-0.05 | — | 0.3-0.7 | |
| *WMC* (nominal) | 0.2 | 10.6 | 1.5 | 0.85 | 0.2 | 0.2 | — | 0.05 max | .007 | .015 | 0.007 | 0.15 | 0.37 | Cu 0.05 |

Thus, this invention provides a composition and thermomechanical treatment for a martensitic steel designed for elevated temperature service, and, in particular provides an especially long stress rupture life at temperatures of 500°–760° C.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A process for making a martensitic steel alloy fuel cladding product for liquid metal cooled reactors, said process comprising the steps of:

preparing and alloy consisting essentially of 9.6–11.6 wt.% chromium, 1.4–1.6 wt.% molybdenum, 0.75–0.95 wt.% manganese, 0.15–0.25 wt.% niobium, 0.3–0.45 wt.% silicon, 0.15–0.25 wt.% carbon, 0.15–0.25 wt.% vanadium, 0.05 maximum wt.% nickel, 0.01–0.02 wt.% nitrogen, 0.01–0.02 wt.% sulfur, 0.03–0.07 wt.% copper, 0.004–0.010 wt.% boron, 0.005–0.010 wt.% phosphorous, and the with remainder being essentially iron;

homogenizing said alloy at about 1000° C. for 16 hours;

annealing said homogenized alloy at 1150° C. for 15 minutes; and tempering said annealed alloy at 700° C. for 2 hours.

* * * * *